United States Patent Office 3,527,747
Patented Sept. 8, 1970

3,527,747
REACTIVE AZO DYESTUFFS CONTAINING A TOLYLSULFONYLMETHYLENE-OXYTRIAZINE GROUP
Angelo Mangini, Antonio Tundo, Bianca Flavia Bonini, and Marta Rossetti, Bologna, Italy, assignors to Aziende Colori Nazionali Affini ACNA S.p.A., Milan, Italy
No Drawing. Filed Mar. 21, 1966, Ser. No. 536,144
Claims priority, application Italy, Mar. 22, 1965, 6,200/65
Int. Cl. C09b 62/06, 62/08, 62/10
U.S. Cl. 260—153
19 Claims

ABSTRACT OF THE DISCLOSURE

Reactive triazine dyestuffs having the formula:

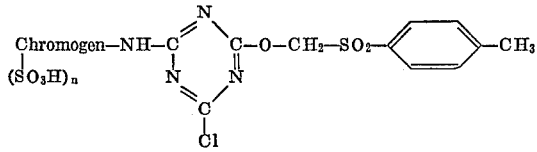

wherein the chromogen is a dyestuff residue selected from the group consisting of azo, metallized azo, anthraquinone and phthalocyanine dyestuffs residues, and $n$ is an integer from 1 to 4, are particularly effective for dyeing cellulose. The dyestuffs may be absorbed and fixed onto the cellulose fibers by hot or cold dyeing techniques. The dyestuffs have high reactivity and good dyeing power and the dyeings obtained therefrom have high brilliance and purity of chromatic shades and improved fastness to washing.

---

The present invention relates to a new class of reactive dyestuffs, that is, dyestuffs which are capable of forming chemical bonds with the hydroxyl groups of cellulose during the dyeing process, thereby giving dyeings which are particularly stable to wet treatments.

Various classes of dyestuffs having reactive groups capable of forming such bonds are already known. These include dyestuffs containing at least one of the following reactive groups: monochlorotriazinyl, dichlorotriazinyl, trichloropyrimidyl, vinylsulfonic, and dichloroquinoxalyl. The dyeing conditions for applying these dyestuffs will vary according to the nature of the groups present.

The present invention provides a new class of dyestuffs characterized by the presence, as a reactive group, of the radical

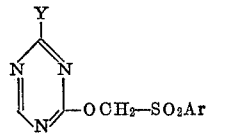

wherein Ar is a substituted or unsubstituted aromatic radical such as an alkyl substituted, preferably lower alkyl substituted aromatic radical and most preferably

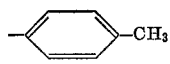

and Y is chlorine or bromine. The present invention also provides methods for preparing such dyestuffs. These dyestuffs may be represented by the following general formula:

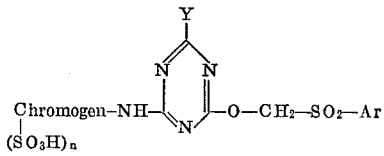

wherein $n$ is an integer from 1 to 4, Y and Ar are as defined above, and the chromogen is the residue of a dyestuff selected from the group consisting of azoic, metallized azoic, anthraquinone and phthalocyanine dyestuffs. The azo dyestuffs of the present invention have the formula:

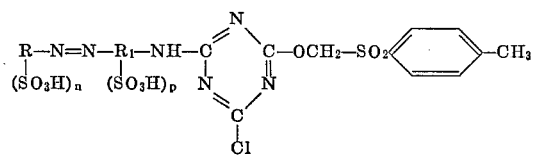

wherein $R_1$ is a nucleus selected from the group consisting of the nuclei of the phenyl and naphthyl series, R is a nucleus selected from the group consisting of the nuclei of the phenyl, naphthyl and pyrazolone series, and wherein each of $n$ and $p$ is 0 or an integer from 1 to 4, the sum of $n$ and $p$ being from 1 to 4. In addition, $R_1$ may contain one or more substituents selected from the group consisting of OH, lower alkyl and ureido, and R may contain one or more substituents selected from the group consisting of OH, lower alkyl, benzoylamino, lower alkanoylamino, ureido, and COOH; and said azo dyestuffs may be metallized with copper.

The reactive radical (I) contains a mobile halogen which, when bound to a dyestuff residue, can, under suitable conditions, react with the hydroxyl groups of cellulose, with the $NH_2$ groups of protein fibers or with the NH groups of synthetic polyamides to form covalent bonds between the dyestuffs and the fiber.

The halogen, which remains bonded to the triazine nucleus of radical (I), has a markedly higher reactivity as compared to the halogen present in corresponding triazine derivatives which have bonded to the triazine nucleus, instead of the group —O—$CH_2$—$SO_2$—Ar, other substituents, for example, an amino group, a mono-or di-alkyl substituted amino group, an aralkyl group, a heterocyclic group, an alkoxy group, an aryloxy group, a thioalkyl group or a thioaryl group.

On the other hand, the reactivity of the triazine nucleus is slightly reduced because of the presence of the group —O—$CH_2$—$SO_2$—Ar, thus resulting in greater stability during drying and storage.

The higher reactivity of the dyestuffs of the present invention, which contain the radical (I) as a reactive group, as compared to the dyestuffs containing, as reactive groups, the radicals (II).

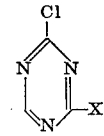

wherein X is $NH_2$, NH—R, OH, OR, SH or SR, R being a substituted or unsubstituted alkyl or aryl group, can be shown by the fact that the reactive dyestuffs containing the radical (I) are capable of dyeing cellulose fibers from an alkaline bath at 40° C., whereas the reactive dyestuffs containing the radical (II) require bath temperatures of 75–80° C. This remarkably improved reactivity also allows the use of lower concentrations of alkalies, as well as the use of continuous dyeing methods, thus reducing the costs of dyeing.

Beside the high reactivity, the dyestuffs of the present invention have numerous additional advantages, such as very good dyeing power, high brilliance and purity of the chromatic shade, and improved fastness to wet treatments of dyed or printed cellulose materials and natural or synthetic polyamide materials.

The dyestuffs of the present invention may be prepared by (1) reacting cyanuric chloride (III) with an aryl-sulphonyl carbinol (IV) and thereafter reacting the triazine (V) thus obtained with aromatic diamines:

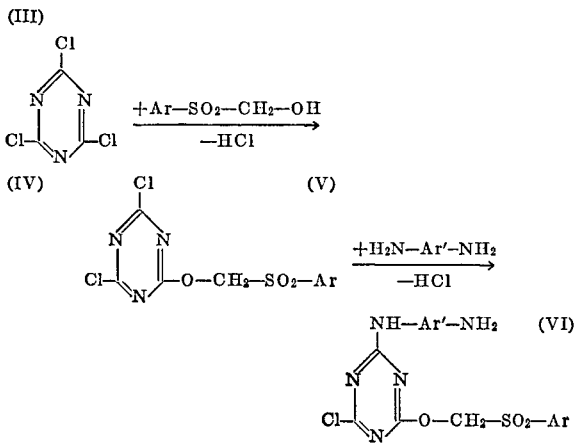

wherein Ar is a substituted or unsubstituted aromatic radical and Ar' is a substituted or unsubstituted benzene, naphthalene or diphenyl radical or the like; and (2) diazotizing the amine (VI) and coupling with a coupling component RH, to obtain a reactive dyestuff having the structure (VII):

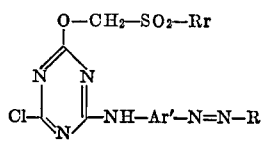

wherein R is the residue of a coupling component selected from sulfonated pyrazolone derivatives, sulfonated naphthylamines, sulfonated naphthols, sulfonated aminonaphthols, etc.

Another way to obtain the dyestuffs of the present invention is by (1) reacting the triazine (V) with various substituted sulfonated aminonaphthols, with formations of the compound (VIII)

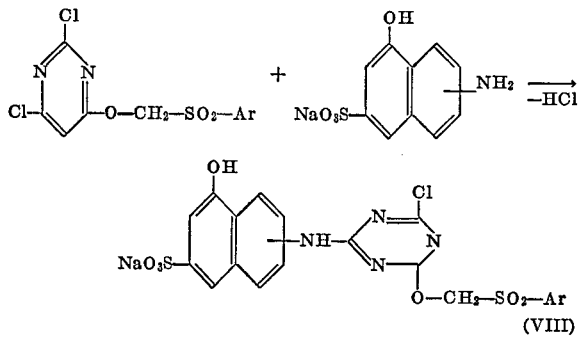

and (2) thereafter coupling the intermediate (VIII) with the desired diazonium salt to form the reactive dyestuff (IX):

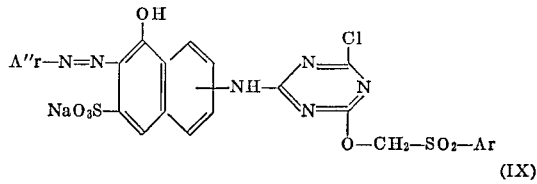

wherein Ar'' is a suitably substituted benzene, naphthalene, or diphenyl nucleus.

Moreover, the triazine (V) can be directly condensed with phthalocyanines, azoic dyestuffs or sulfonated anthraquinone dyestuffs containing a free amino-group to yield directly the reactive dyestuffs (X):

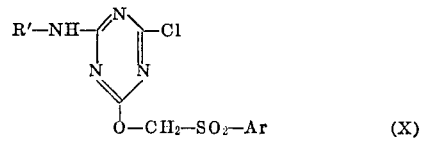

wherein R' is the residue of the azoic, phthalocyanine or sulfonated anthraquinone used.

In order to improve the stability of the dyestuffs of the present invention to storing, buffering substances such as borates, phosphates, or monosodium phosphate, disodium phosphate or mixtures thereof may be added thereto.

The present invention also provides cellulose and natural or synthetic materials dyed or printed with one or more of the dyestuffs containing, as a reactive group, the radical (I).

The following examples serve to further illustrate the present invention without in any way limiting the scope thereof.

EXAMPLE 1

(a) Preparation of the triazine (XI)

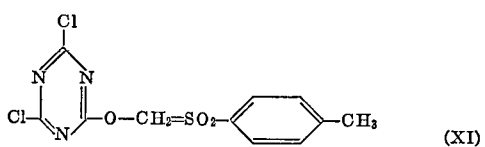

A solution of 0.1 mol of p-tolyl-hydroxymethyl-sulfone in 100 ml. of acetone was introduced dropwise within 20–30 minutes, while maintaining the temperature at about 0° C., into a solution of 0.1 mol of cyanuric chloride in 200 ml. of acetone. Then, within about 40 minutes, a solution of 0.1 mol of collidine in 50 ml. acetone was introduced, while the temperature was always maintained at about 0° C. The collidine hydrochloride began immediately to precipitate. The mixture was kept under agitation at 0° C. for 5 hours and then the collidine hydrochloride was filtered. The acetone solution filtrate was poured into water and ice under agitation. The precipitated product was collected by filtration and dried under vacuum. After crystallization from carbon tetrachloride, it showed a melting point of 168–70° C.

(b) Preparation of the amine (XII)

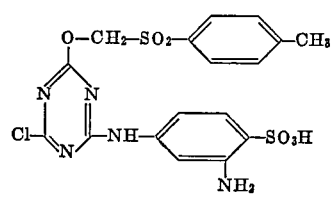

A solution of 0.1 mol of

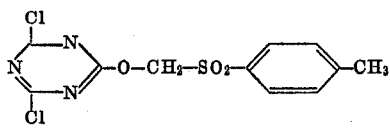

in 80 ml. of acetone was added dropwise under agitation within 25 minutes to a neutral solution of 0.1 mol of 2,4-diaminobenzenesulfonic acid and 0.1 mol of sodium acetate in 120 ml. of water, while maintaining the temperature between 18° and 20° C. At the end of the dropwise addition, the reaction mixture was agitated for 1 hour and 20 minutes at about 20° C. and then the 0.1 mol of HCl liberated by the condensation reaction was neutralized with 10% aqueous $Na_2CO_3$.

(c) Preparation of the dyestuff

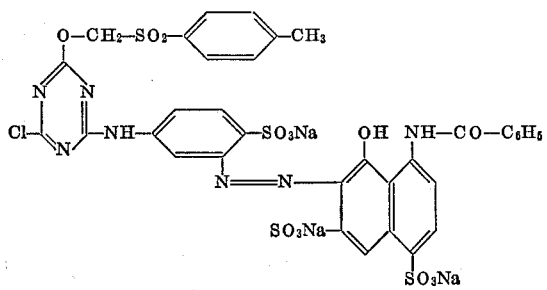

0.1 mol of the amine (XII), in the solution obtained as described above, was directly diazotized in the usual manner and the diazonium salt thus obtained was coupled at 4–6° C. with 0.1 mol of 8-benzamido-1-naphthol-3,6-disulfonic acid at a pH of about 8. At the end of the addition of the diazonium salt, the reaction mixture was agitated for 3–4 hours, the pH then adjusted to 7.2, and the dyestuff salted out with KCl. The precipitate obtained was collected by filtration and dried at 40° C. It was used to dye cotton to a red shade; the dyeing exhibited good fastness to washing.

EXAMPLE 2

By coupling 1-(p-sulfo-phenyl)-3-methyl-5-pyrazolone with the amine (XII), prepared according to the procedure of Example 1, a dyestuff having the following structure

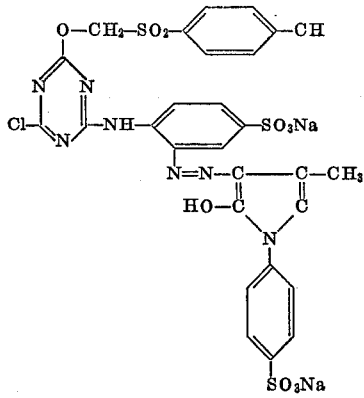

was obtained. This dyestuff was used to dye cotton yellow; the dyeing exhibited very good fastness to wet treatments.

EXAMPLE 3

By coupling the amine (XII), prepared according to the procedure of Example 1, with 8-benzamido-1-naphthol-3,5-disulfonic acid, the following dyestuff

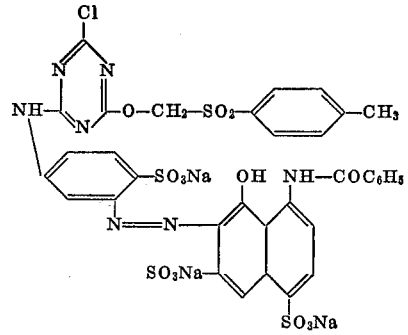

was obtained. This dyestuff gave very fast red dyeings with various fibers.

EXAMPLE 4

By coupling 1-(2',5'-dichloro-4'-sulfo-phenyl)-3-methyl-5-pyrazolone with the amine (XII), prepared according to the procedure of Example 1, the following dyestuff, which was used to dye cellulose fibers yellow and exhibited good fastness to washing, was obtained.

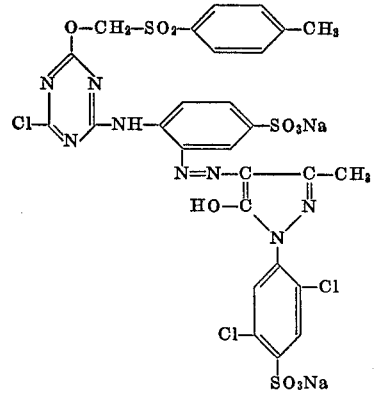

EXAMPLE 5

By coupling the amine (XII) with 6-ureido-1-naphthol-3-sulfonic acid, the dyestuff:

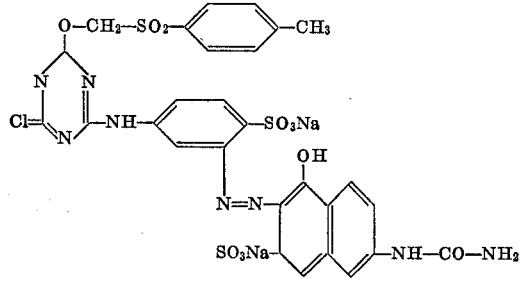

was obtained. This dyestuff dyed cotton orange and exhibited good fastness.

EXAMPLE 6

A dyestuff having the following structure:

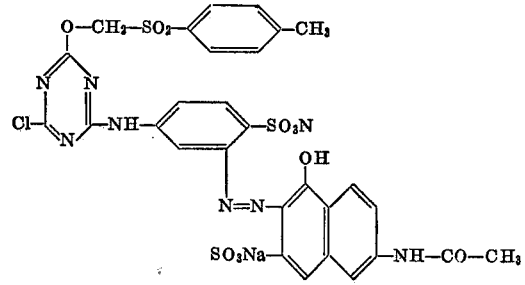

was obtained by coupling 6-acetamido-1-naphthol-3-sulfonic acid with the amine (XII).

EXAMPLE 7

A solution of 0.01 mol of the triazine (XI) (prepared as described in Example 1) dissolved in 120 ml. of acetone was added dropwise under agitation within 30 minutes to a neutral solution of 0.01 mol of 6-amino-1-naphthol-3-sulfonic acid (isogamma acid) and 0.01 mol of sodium acetate in 180 ml. of water while maintaining the temperature between 18° and 20° C. At the end of the dropwise addition, the reaction mixture was agitated for 1 hour and 30 minutes at about 20° C. and the solution thus obtained was neutralized. The naphthol-derivative reaction product:

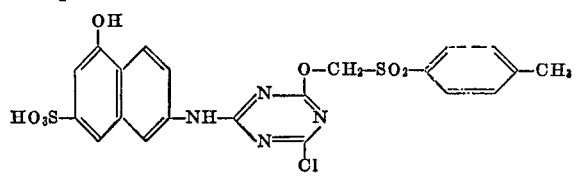

in said solution was coupled in slightly alkaline medium with the diazonium salt of orthanilic acid,

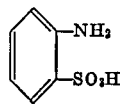

The following dyestuff was obtained:

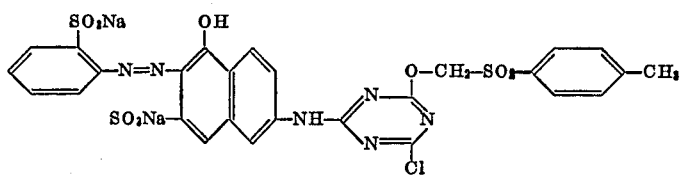

This dyestuff gave very fast orange dyeings with various fibers.

EXAMPLE 8

By operating as described in Example 7 and using the

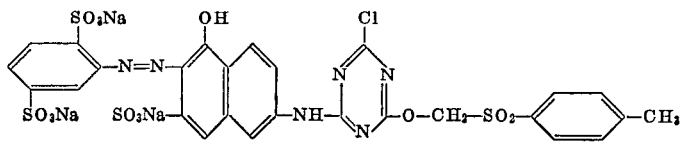

diazonium salt of 2,5-disulfo-aniline as the diazo component, the following dyestuff:
was obtained. Using this dyestuff to dye cotton, very fast orange dyeings were obtained.

EXAMPLE 9

By working as described in the Example 7 and using the diazonium salt of Tobias acid as the diazo component, the following dyestuff:

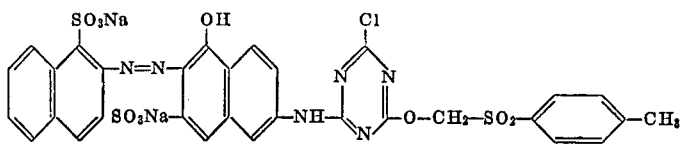

was obtained. This dyestuff was used to dye cotton and gave very fast orange dyeings.

EXAMPLE 10

By working as described in Example 7 and using the diazonium salt of m-amino-benzoic acid as the diazo component, the following dyestuff:

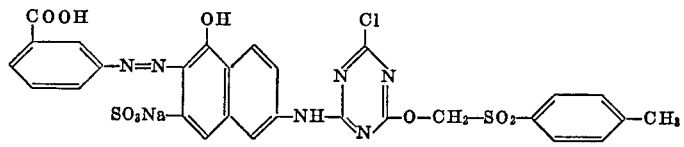

which dyed cellulose fibers a fast, brilliant orange, was obtained.

EXAMPLE 11

The dyestuff having the following structure:

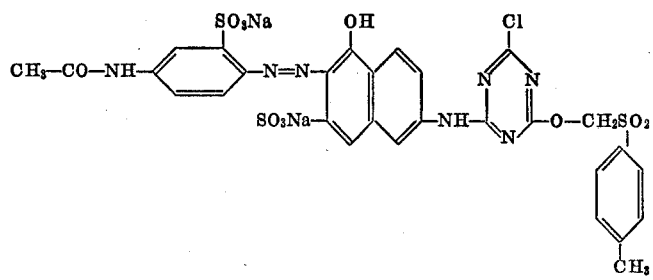

was obtained by coupling, in slightly alkaline medium (pH=8), the diazonium salt of 2-amino-5-acetamidobenzene sulfonic acid with the condensation product of the triazine (XI) with isogamma acid (prepared as described in Example 7). This dyestuff gave fast scarlet dyeings when applied to cotton.

EXAMPLE 12

By working as described in Example 7 and using the diazonium salt of 2-amino-6,8-naphthalenedisulfonic acid as the diazo component, the following dyestuff:

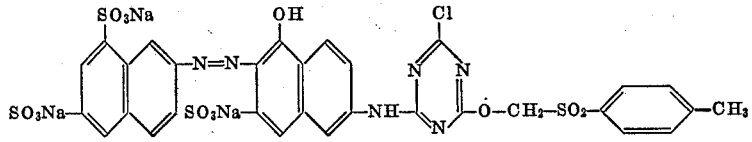

which dyes cotton fast scarlet was obtained.

EXAMPLE 13

0.01 mol of the triazine (XI), prepared as described in Example 1, was dissolved in 120 ml. of acetone and the acetone solution was added dropwise at 20° C. and under agitation to an aqueous solution containing 0.01 mol of the amine:

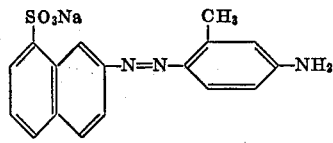

and 0.01 mol of sodium acetate. After the addition was completed, the agitation was continued until complete solution (2–3 hrs.). The solution was then neutralized with 10% aqueous $Na_2CO_3$ and the dyestuff salted out. Upon filtration, the dyestuff having the following structure:

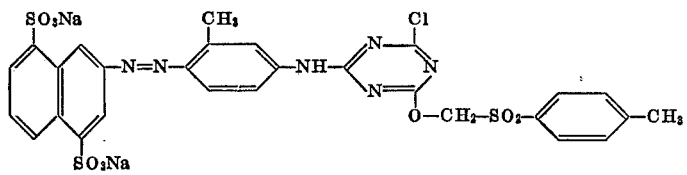

was obtained in the form of a yellow powder which dyed cotton a fast yellow.

EXAMPLE 14

0.01 mol of the amine

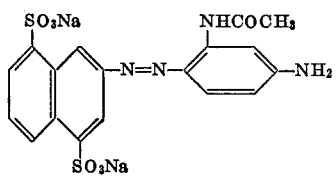

was condensed with 0.01 of the triazine (XI) (prepared as described in Example 1) in the presence of 0.01 mol of sodium acetate following the procedure described in Example 13. The following dyestuff was obtained in the form of a yellow powder which dyed cotton fast yellow:

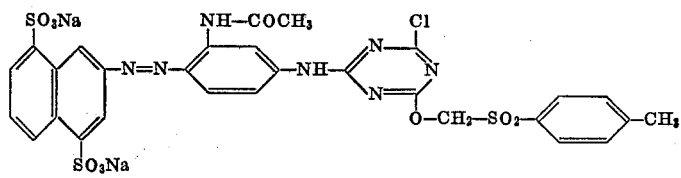

EXAMPLE 15

0.01 mol of the triazine (XI) (prepared as described in Example 1) was dissolved in 120 ml. of acetone and the solution was added dropwise at 20° C. under agitation in an aqueous solution containing 0.01 mol of 1-amino-2-sulfo-4-(4'-amino-3'-sulfo-anilino)-anthraquinone and 0.01 mol of sodium acetate. After completion of the addition, the agitation was continued until complete solution. Then the solution was neutralized and the dyestuff salted out. The dyestuff, which was collected by filtration, had the following structure:

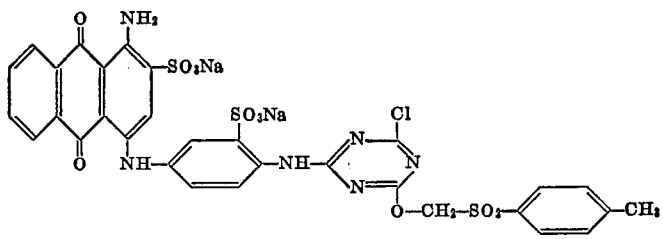

It gave a very fast blue dyeing when applied to cellulose fibers.

EXAMPLE 16

0.01 mol of

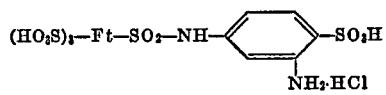

(wherein Ft is copper phthalocyanine) was suspended in water and then dissolved by neutralization with 10% aqueous $Na_2CO_3$. 0.01 mol of sodium acetate was added and then an acetone solution of 0.01 mol of the triazine (XI) was added dropwise at 20° C. The reaction mixture was agitated at 20° C. until complete solution (2–3 hrs.). Then the solution was neutralized and the dyestuff salted out. The dyestuff, which was collected by filtration, had the following structure:

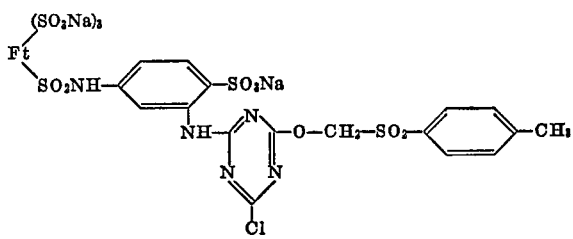

It dyed cotton very fast turquoise.

EXAMPLE 17

A dyestuff having the following structure:

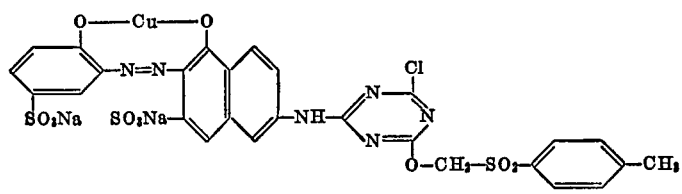

was obtained by reacting in waetr 0.01 mol of the following copper complex:

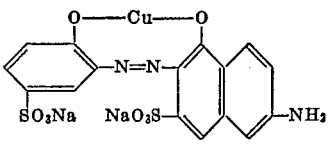

with 0.01 mol of the triazine (XI) in the presence of 0.01 mol of sodium acetate, following the procedure described in Example 13.

EXAMPLE 18

A dyestuff having the following structure:

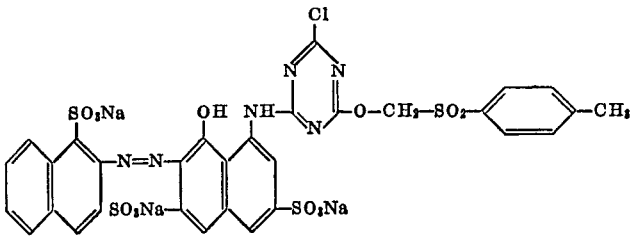

was obtained by reacting 0.01 mol of the following mono-azo compound:

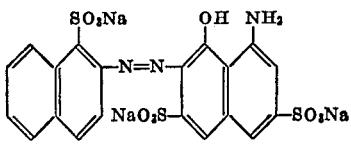

with 0.01 mol of the triazine (XI) in the presence of 0.01 mol of sodium acetate, following the procedure described in Example 13.

EXAMPLE 19

0.2 g. of the dyestuff of Example 15 was dissolved at 50° C. in 200 ml. of water. A 10 g. cotton skein was immersed in the thus obtained solution and the temperature was raised to 60° C. Then 40 g./l. of $Na_2SO_4$ were added and the temperature allowed to fall to 50° C. within 20–30 minutes. At this temperature, 8 g./l. of $Na_2CO_3$ were added in 2 portions at 10 minute intervals and the dyeing then continued for another hour. Thereafter, the skein was rinsed in cold water, then in hot water and then treated with a solution containing 2 g./l. of a non-ionic detergent for thirty minutes. It was then rinsed again with cold water and dried. The cotton skein was dyed a blue shade having very good fastness to wet treatments and to light.

EXAMPLE 20

A cellulose fiber fabric was impregnated at the foulard with a solution consisting of 30 g./l. of the dyestuff of Example 2, 15–20 ml. of 36° Bé. NaOH, 10 g./l. of $Na_2SO_4$. Then the excess liquid was wrung out, the fabric retaining 80% of its weight of the dyestuff solution. The thus impregnated fabric was wound on a roll. Evaporation was prevented by wrapping a polyethylene film or another insulating material around the fabric. After 3–4 hrs. the roll of fabric was unwound and the fabric washed repeatedly, first in cold water and then in warm water, and then treated with a solution containing 2 g./l. of non-ionic detergent for 30 minutes. The cellulose fabric was dyed a yellow shade, the dyeing being very fast to the wet treatments and to light.

Having thus described our invention, what we desire to secure by Letters Patent and hereby claim is:

1. A reactive dyestuff having the formula:

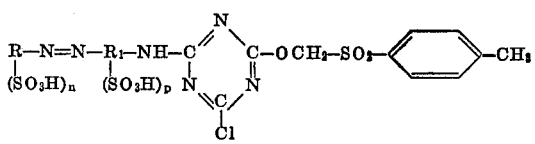

wherein $R_1$ is a nucleus selected from the group consisting of the nuclei of the phenyl and naphthyl series, R is a nucleus selected from the group consisting of the nuclei of the phenyl, naphthyl and pyrazolone series, and wherein each of $n$ and $p$ is 0 or an integer from 1 to 4, the sum $n$ and $p$ being from 1 to 4.

2. The dyestuff of claim 1 wherein $R_1$ contains one or more substituents selected from the group consisting of OH, lower alkyl and ureido, and R contains one or more substituents selected from the group consisting of OH, lower alkyl, benzoylamino, lower alkanoylamino, ureido and COOH.

3. The dyestuff of claim 1 which is metallized with copper.

4. The reactive dyestuff of claim 2 which has the structure:

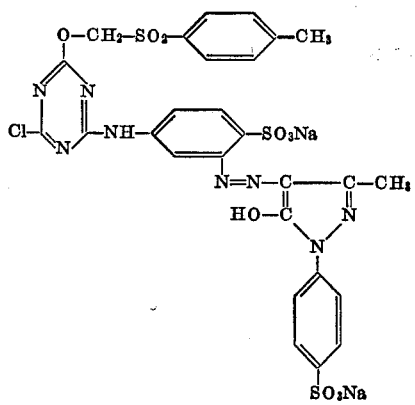

5. The reactive dyestuff of claim 2 which has the structure:

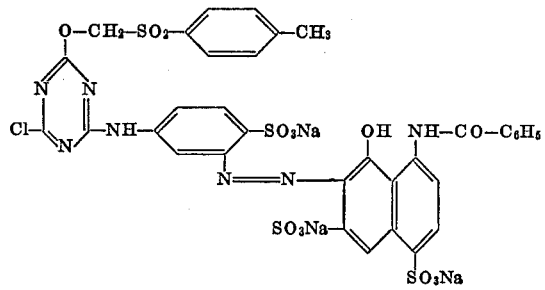

6. The reactive dyestuff of claim 2 which has the structure:

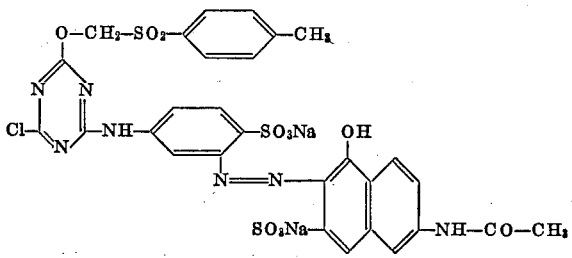

7. The reactive dyestuff of claim 2 which has the structure:

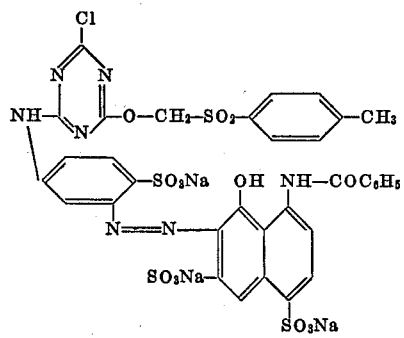

8. The reactive dyestuff of claim 2 which has the structure:

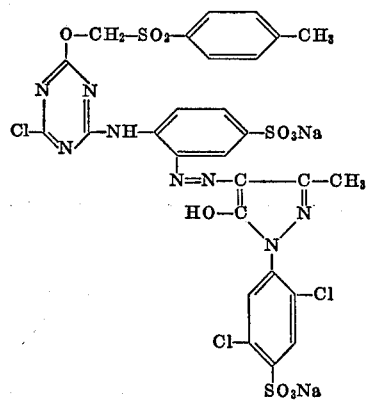

9. The reactive dyestuff of claim 2 which has the structure:

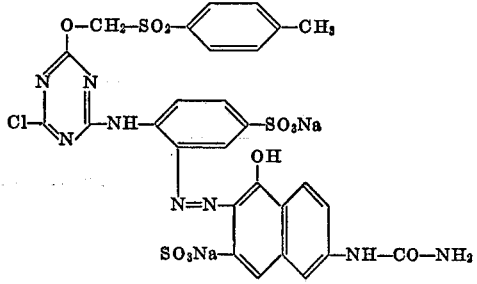

10. The reactive dyestuff of claim 2 which has the structure:

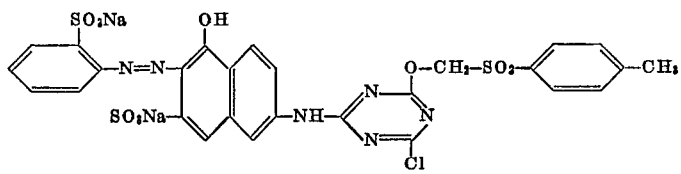

11. The reactive dyestuff of claim 2 which has the structure:

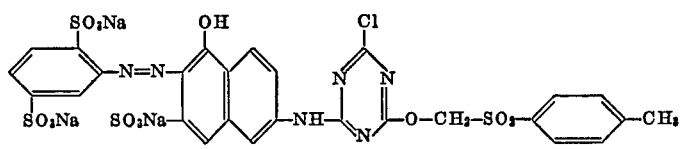

12. The reactive dyestuff of claim 2 which has the structure:

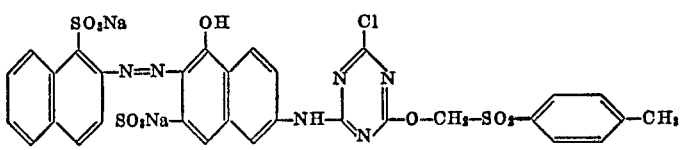

13. The reactive dyestuff of claim 2 which has the structure:

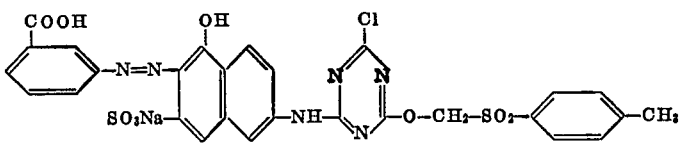

14. The reactive dyestuff of claim 2 which has the structure:

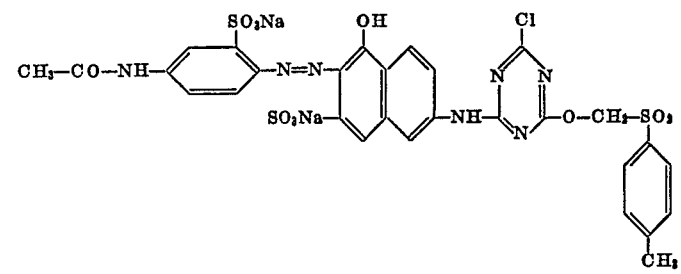

15. The reactive dyestuff of claim 2 which has the structure:

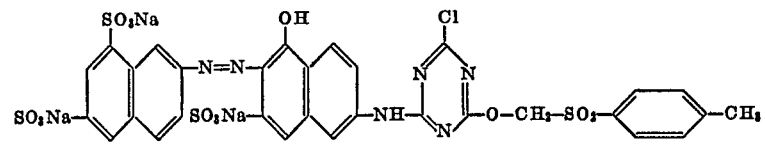

16. The reactive dyestuff of claim 2 which has the structure:

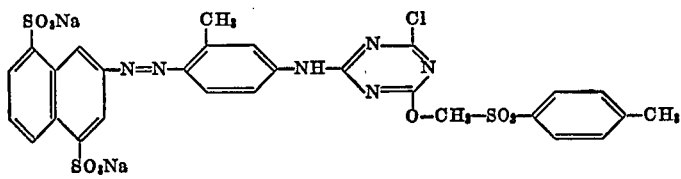

17. The reactive dyestuff of claim 2 which has the structure:
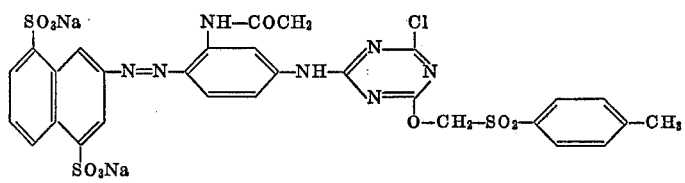
18. The reactive dyestuff of claim 2 which has the structure:
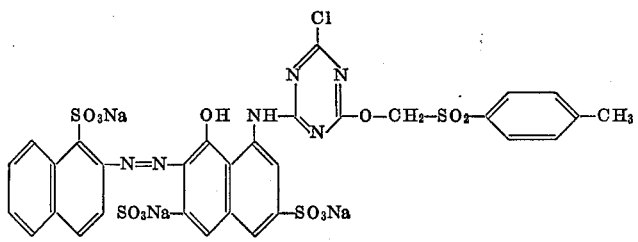
19. The reactive dyestuff of claim 3 which has the structure:
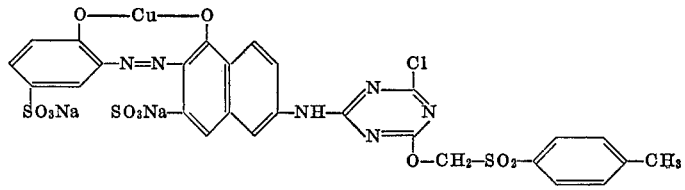
References Cited
UNITED STATES PATENTS
| | | | |
|---|---|---|---|
| 2,824,823 | 2/1958 | Wolf | 260—248 XR |
| 2,891,941 | 6/1959 | Fasciati et al. | 260—153 |
| 3,065,191 | 11/1962 | Heslop et al. | 260—153 |
| 3,084,163 | 4/1963 | Willmund et al. | 260—248 |
| 3,108,029 | 10/1963 | Wohnsiedler et al. | 260—248 XR |
| 3,135,731 | 6/1964 | Tilley et al. | 260—153 |
| 3,397,204 | 8/1968 | Gaertner | 260—248 |
FLOYD D. HIGEL, Primary Examiner
U.S. Cl. X.R.
260—116, 242, 249, 248, 249.5; 8—39, 40, 41, 42, 50, 54.2, 55, 63, 70, 71

PO-1050
(5/69)

UNITED STATES PATENT OFFICE
CERTIFICATE OF CORRECTION

Patent No. 3,527,747    Dated September 8, 1970

Inventor(s) Angelo Mangini, Antonio Tundo, Fianca Flavia Bonini and Marta Rossetti It is certified that error appears in the above-identified patent and that said Letters Patent are hereby corrected as shown below:

Column 1, line 51, the second structural formula,

" 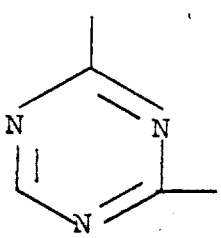 should read

-- 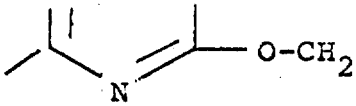 --

Column 3, third structural formula, "O-CH$_2$-SO$_2$-Rr" should read -- O-CH$_2$-SO$_2$-Ar --. Column 4, line 9, the first structural formula, " 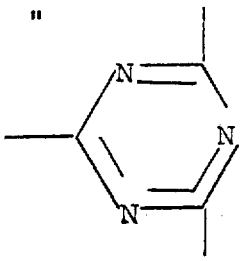 " should read -- 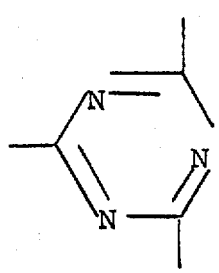 --.

PR

PO-1050
(5/69)

UNITED STATES PATENT OFFICE
CERTIFICATE OF CORRECTION

Patent No. 3,527,747          Dated September 8, 1970

Inventor(s) Angelo Mangini, Antonio Tundo, Fianca Flavia Bonini and Marta Rossetti          PAGE - 2

It is certified that error appears in the above-identified patent and that said Letters Patent are hereby corrected as shown below:

Column 5, first structural formula,

" 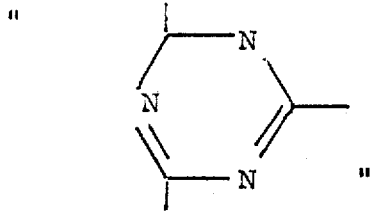  "   should read   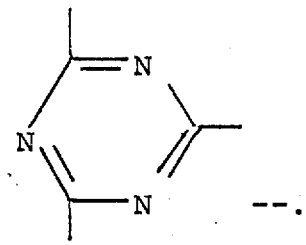 --.

Column 6, line 15, first structural formula,

" 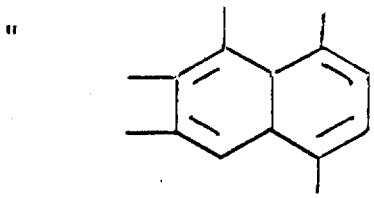   should read   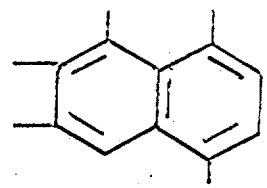 --.
"

Column 6, line 50, third structural formula,

" 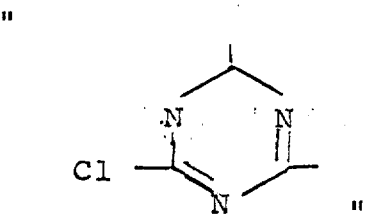   should read   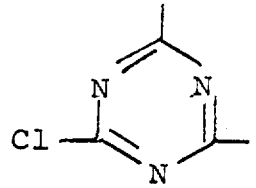 --.
"

PR

PO-1050
(5/69)

UNITED STATES PATENT OFFICE
CERTIFICATE OF CORRECTION

Patent No. 3,527,747      Dated September 8, 1970

Inventor(s) Angelo Mangini, Antonio Tundo, Fianca Flavia Bonini and Marta Rossetti It is certified that error appears in the above-identified patent and that said Letters Patent are hereby corrected as shown below:

Column 6, line 55, third structural formula,

" 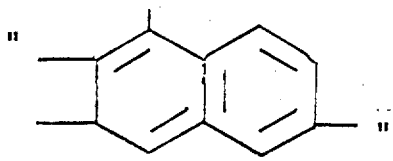 should read 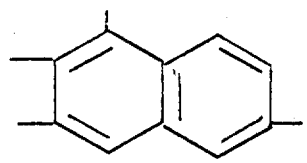 --.

Column 8, line 5 (Example 8), after "By operating as described in Example 7 and using the" insert -- diazonium salt of 2,5-disulfo-aniline as the diazo component, the following dyestuff: --; lines 17 and 18 (Example 8), delete "diazonium salt of 2,5-disulfo-aniline as the diazo component, the following dyestuff:".

Column 9, line 20, "benzene sulfonic" should read -- benzenesulfonic --.

Column 12, line 1, "waetr" should read -- water --.

Column 14, claim 7, the structural formula

" 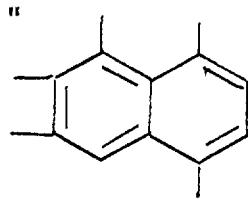 should read 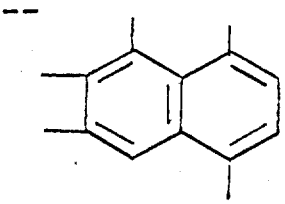 --.

PO-1050
(5/69)

UNITED STATES PATENT OFFICE
CERTIFICATE OF CORRECTION

Patent No. __3,527,747__ Dated __September 8, 1970__

Inventor(s) Angelo Mangini, Antonio Tundo, Fianca Flavia Bonini and Marta Rossetti It is certified that error appears in the above-identified patent and that said Letters Patent are hereby corrected as shown below:

Column 14, claim 8, the structural formula

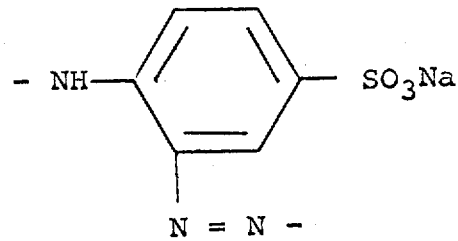    " should read    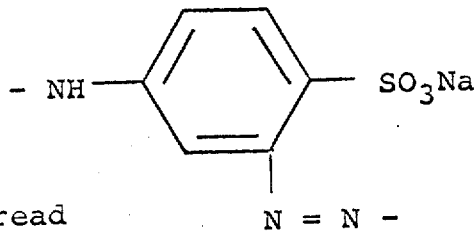  --.

Column 14, claim 9, the structural

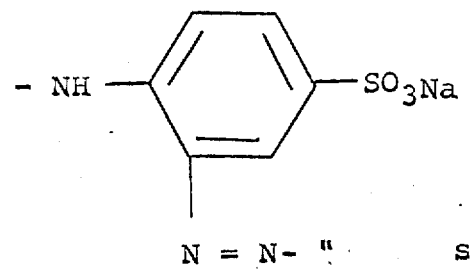    " should read    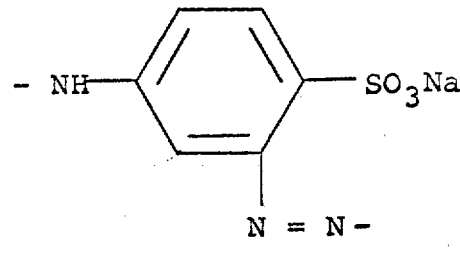  --.

Signed and sealed this 22nd day of February 1972.

(SEAL)
Attest:

EDWARD M. FLETCHER, JR.          ROBERT GOTTSCHALK
Attesting Officer                 Commissioner of Patents